US012626918B2

(12) United States Patent
Kim et al.

(10) Patent No.: US 12,626,918 B2
(45) Date of Patent: May 12, 2026

(54) POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

(71) Applicant: LG Energy Solution, Ltd., Seoul (KR)

(72) Inventors: Ji-Hye Kim, Daejeon (KR);
Byung-Chun Park, Daejeon (KR);
Jung-Min Han, Daejeon (KR);
Jong-Wook Heo, Daejeon (KR);
Wang-Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 536 days.

(21) Appl. No.: 18/031,074

(22) PCT Filed: Oct. 29, 2021

(86) PCT No.: PCT/KR2021/015485
§ 371 (c)(1),
(2) Date: Apr. 10, 2023

(87) PCT Pub. No.: WO2022/092922
PCT Pub. Date: May 5, 2022

(65) Prior Publication Data
US 2023/0378456 A1 Nov. 23, 2023

(30) Foreign Application Priority Data
Oct. 29, 2020 (KR) ........................ 10-2020-0142376

(51) Int. Cl.
*H01M 4/00* (2006.01)
*C01G 53/50* (2025.01)
(Continued)

(52) U.S. Cl.
CPC ............ *H01M 4/525* (2013.01); *C01G 53/50* (2013.01); *H01M 4/131* (2013.01); *H01M 4/366* (2013.01);
(Continued)

(58) Field of Classification Search
CPC ........ H01M 4/525; H01M 4/52; H01M 4/131; H01M 4/366; H01M 4/505; H01M 4/62;
(Continued)

(56) References Cited

U.S. PATENT DOCUMENTS

2015/0010819 A1 1/2015 Lee et al.
2015/0221934 A1 8/2015 Hiratsuka et al.
(Continued)

FOREIGN PATENT DOCUMENTS

EP 3272710 A1 * 1/2018 ............ H01M 4/485
EP 3663265 A2 6/2020
(Continued)

OTHER PUBLICATIONS

International Search Report for PCT/KR2021/015485 mailed Mar. 2, 2022. 3 pages.

*Primary Examiner* — Raymond Alejandro
(74) *Attorney, Agent, or Firm* — Lerner David LLP

(57) ABSTRACT

A positive electrode active material includes at least one secondary particle including an agglomerate of primary macro particles. The average particle size of the primary macro particle is 2 μm or more. A ratio of the average particle size of the primary macro particle to an average crystal size of the primary macro particle is 8 or more. An average particle size of the secondary particle is 3 to 10 μm. The secondary particle includes a nickel-based lithium transition metal oxide. The primary macro particle does not crack in a rolling process under 9 tons. A method for preparing the positive electrode active material includes
(Continued)

SU8000 1.0kV 2.9mm x20.0k LA30(U)    2.00μm mixing a nickel-based transition metal oxide precursor having a tap density of 2.0 g/cc or less and a lithium precursor and performing primary sintering to form a primary sintered product and performing secondary sintering on the primary sintered product.

13 Claims, 9 Drawing Sheets

(51) Int. Cl.

| | | |
|---|---|---|
| H01M 4/131 | (2010.01) | |
| H01M 4/36 | (2006.01) | |
| H01M 4/505 | (2010.01) | |
| H01M 4/525 | (2010.01) | |
| H01M 4/62 | (2006.01) | |
| H01M 10/0525 | (2010.01) | |
| H01M 4/02 | (2006.01) | |

(52) U.S. Cl.
CPC ............. *H01M 4/505* (2013.01); *H01M 4/62* (2013.01); *H01M 10/0525* (2013.01); *C01P 2002/52* (2013.01); *C01P 2004/03* (2013.01); *C01P 2004/53* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/028* (2013.01)

(58) Field of Classification Search
CPC ............. H01M 4/583; H01M 10/0525; H01M 10/052; H01M 2004/021; H01M 2004/028; C01P 2004/03; C01P 2004/53; C01P 2004/61; C01P 2004/62; C01P 2004/80; C01P 2006/40; C01P 2002/52
See application file for complete search history.

(56) References Cited

U.S. PATENT DOCUMENTS

| | | | |
|---|---|---|---|
| 2015/0243978 A1 | 8/2015 | Shon et al. | |
| 2016/0248090 A1 | 8/2016 | Maeda et al. | |
| 2018/0145319 A1* | 5/2018 | Kim | C01G 51/00 |
| 2018/0261842 A1 | 9/2018 | Park et al. | |
| 2019/0020024 A1 | 1/2019 | Wang et al. | |
| 2020/0161650 A1 | 5/2020 | Park et al. | |
| 2020/0185712 A1 | 6/2020 | Hiratsuka | |
| 2020/0295367 A1 | 9/2020 | Yoo et al. | |
| 2020/0343553 A1 | 10/2020 | Kim et al. | |
| 2020/0388830 A1 | 12/2020 | Lee et al. | |
| 2021/0005878 A1 | 1/2021 | Lee et al. | |
| 2021/0408537 A1 | 12/2021 | Hwang et al. | |
| 2022/0059836 A1 | 2/2022 | Hiratsuka et al. | |
| 2022/0149354 A1 | 5/2022 | Omura et al. | |

FOREIGN PATENT DOCUMENTS

| | | | |
|---|---|---|---|
| JP | 2014149962 A | 8/2014 | |
| JP | 2015164119 A | 9/2015 | |
| JP | 2016012500 A | 1/2016 | |
| JP | 2016157677 A | 9/2016 | |
| JP | 2020520539 A | 7/2020 | |
| KR | 20150006283 A | 1/2015 | |
| KR | 20150099219 A | 8/2015 | |
| KR | 20160083616 A | 7/2016 | |
| KR | 20170063408 A | 6/2017 | |
| KR | 20190006906 A | 1/2019 | |
| KR | 20190059241 A | 5/2019 | |
| KR | 20190059249 A | 5/2019 | |
| KR | 20190101735 A | 9/2019 | |
| KR | 20200029961 A | 3/2020 | |
| KR | 20200059164 A | 5/2020 | |
| KR | 20200081277 A | 7/2020 | |
| WO | 2019044205 A1 | 3/2019 | |
| WO | 2019151834 A1 | 8/2019 | |
| WO | 2019235886 A1 | 12/2019 | |
| WO | 2020137296 A1 | 7/2020 | |
| WO | 2020175506 A1 | 9/2020 | |

* cited by examiner

1

POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2021/015485, filed on Oct. 29, 2021, which claims priority to Korean Patent Application No. 10-2020-0142376 filed on Oct. 29, 2020, in the Republic of Korea, the disclosures of which are incorporated herein by reference.

TECHNICAL FIELD

The present disclosure relates to a positive electrode active material for a lithium secondary battery comprising primary macro particles and a method for preparing the same.

BACKGROUND ART

Recently, with the widespread use of electronic devices using batteries, for example, mobile phones, laptop computers and electric vehicles, there is a fast growing demand for secondary batteries with small size, light weight and relatively high capacity. In particular, lithium secondary batteries are gaining attention as a power source for driving mobile devices due to their light weight and high energy density advantages. Accordingly, there are many efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and produces electrical energy by oxidation and reduction reactions during intercalation/deintercalation of lithium ions at the positive electrode and the negative electrode.

The positive electrode active material of the lithium secondary battery includes lithium cobalt oxide ($LiCoO_2$), lithium nickel oxide ($LiNiO_2$), lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and is used as a positive electrode active material for high voltage. However, there is a limitation in the use of a large amount of cobalt (Co) as a power source in the field of electric vehicles due to its price rise and unstable supply, and thus there is a need for development of a positive electrode active material as an alternative.

Accordingly, nickel cobalt manganese based lithium composite transition metal oxide (hereinafter simply referred to as 'NCM based lithium composite transition metal oxide') with partial substitution of nickel (Ni) and manganese (Mn) for cobalt (Co) has been developed.

Meanwhile, as shown in FIG. 1, the conventional NCM based lithium composite transition metal oxide is in the form of a secondary particle formed by agglomeration of primary micro particles, and has a large specific surface area and low particle rigidity, and when an electrode is made of the positive electrode active material comprising secondary particles formed by agglomeration of primary micro particles and undergoes a rolling process as shown in FIG. 1, a large amount of gas is produced during cell operation due to severe particle cracking, resulting in low stability. In particular, high-Ni NCM based lithium composite transition metal oxide with high capacity has low structural and chemical stability and is more difficult to ensure thermal stability.

DISCLOSURE

Technical Problem

The present disclosure is directed to providing a positive electrode active material in the form of a secondary particle having the average particle size D50 of the same or similar level to the conventional art, comprising primary macro particles as opposed to the conventional art, thereby minimizing particle cracking in a rolling process.

Accordingly, the present disclosure is further directed to providing a nickel-based positive electrode active material with high press density, long life and good gas performance.

Technical Solution

An aspect of the present disclosure provides a positive electrode active material for a lithium secondary battery according to the following embodiment.

A first embodiment relates to a positive electrode active material for a lithium secondary battery comprising a secondary particle comprising an agglomerate of a primary macro particle, wherein an average particle size D50 of the primary macro particle is 2 μm or more, a ratio of the average particle size D50 of the primary macro particle/an average crystal size of the primary macro particle is 8 or more, an average particle size (D50) of the secondary particle is 3 to 10 μm, the secondary particle comprises a nickel-based lithium transition metal oxide, and the primary macro particle does not crack in a rolling process of the at least one secondary particle under 9 tons.

A second embodiment relates to the positive electrode active material for a lithium secondary battery according to the first embodiment, wherein the average crystal size of the primary macro particle is 200 nm or more.

A third embodiment relates to the positive electrode active material for a lithium secondary battery according to the first or second embodiment, wherein a ratio of the average particle size (D50) of the secondary particle to the average particle size (D50) of the primary macro particle is 2 to 4 times.

A fourth embodiment relates to the positive electrode active material for a lithium secondary battery according to any one of the first to third embodiments, wherein the nickel-based lithium transition metal oxide comprises $LiaNi_{1-x-y}Co_xM1_yM2_wO_2$, and wherein $1.0 \leq a \leq 1.5$, $0 \leq x \leq 0.2$, $0 \leq y \leq 0.2$, $0 \leq w \leq 0.1$, $0 \leq x+y \leq 0.2$, M1 includes at least one of Mn and Al, and M2 includes at least one of Ba, Ca, Zr, Ti, Mg, Ta, Nb and Mo.

A fifth embodiment relates to the positive electrode active material for a lithium secondary battery according to any one of the first to fourth embodiments, wherein the positive electrode active material further comprises fine particles of 1 μm or less in an amount less than 10% after the rolling process of the positive electrode active material under 9 tons.

A sixth embodiment relates to the positive electrode active material for a lithium secondary battery according to any one of the first to fifth embodiments, wherein the positive electrode active material further comprises a sintering additive, the sintering additive including at least one of zirconium, yttrium or strontium.

A seventh embodiment relates to the positive electrode active material for a lithium secondary battery according to any one of the first to sixth embodiments, wherein the positive electrode active material is further coated on a surface thereof with a boron containing material.

An eighth embodiment relates to the positive electrode active material for a lithium secondary battery according to any one of the first to seventh embodiments, wherein the positive electrode active material is further coated on a surface thereof with a cobalt containing material.

An aspect of the present disclosure provides a positive electrode for a lithium secondary battery according to the following embodiment.

A ninth embodiment provides a positive electrode for a lithium secondary battery comprising a positive electrode current collector and a positive electrode active material layer formed on the positive electrode current collector, the positive electrode active material layer comprising the above-described positive electrode active material.

An aspect of the present disclosure provides a lithium secondary battery according to the following embodiment.

A tenth embodiment provides a lithium secondary battery comprising a positive electrode comprising the above-described positive electrode active material.

An aspect of the present disclosure provides a method for preparing a positive electrode active material for a lithium secondary battery according to the following embodiment.

An eleventh embodiment provides a method for preparing a positive electrode active material for a lithium secondary battery as described above comprising (S1) mixing a nickel-based transition metal oxide precursor having a tap density of 2.0 g/cc or less and a lithium precursor and performing primary sintering to form a primary sintered product; and (S2) performing secondary sintering on the primary sintered product.

A twelfth embodiment relates to the method for preparing a positive electrode active material for a lithium secondary battery according to the eleventh embodiment, wherein a temperature of the primary sintering is 780 to 900° C.

A thirteenth embodiment relates to the method for preparing a positive electrode active material for a lithium secondary battery according to the eleventh or twelfth embodiment, wherein a temperature of the secondary sintering is 650 to 800° C.

A fourteenth embodiment relates to the method for preparing a positive electrode active material for a lithium secondary battery according to any one of the tenth to thirteenth embodiments, wherein the method does not comprise washing between the primary sintering (S1) and the secondary sintering (S2).

Advantageous Effects

According to an embodiment of the present disclosure, it is possible to provide a positive electrode active material comprising secondary particles with improved resistance by simultaneously growing the average particle size D50 and the crystal size of primary macro particles.

According to an embodiment of the present disclosure, it is possible to provide a nickel-based positive electrode active material with high press density, long life and good gas performance.

DESCRIPTION OF DRAWINGS

The accompanying drawings illustrate the preferred embodiment of the present disclosure, and together with the above description, serve to help a further understanding of the technical aspects of the present disclosure, so the present disclosure should not be construed as being limited to the drawings. Meanwhile, the shape, size, scale or proportion of the elements in the drawings of the specification may be exaggerated to emphasize a more clear description.

DETAILED DESCRIPTION

Figure 1:
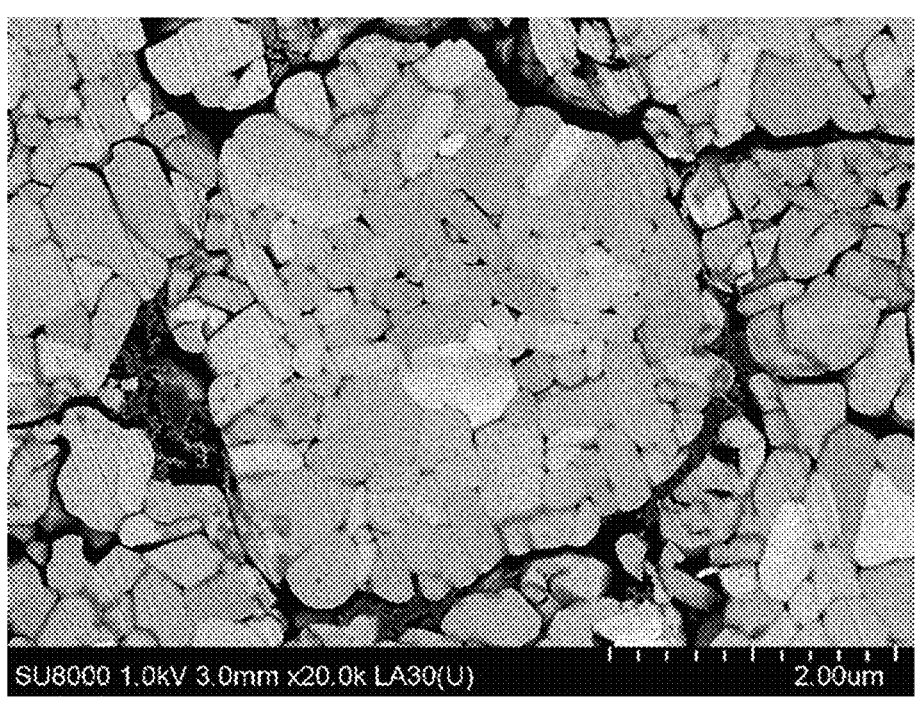
FIG. 1 is a scanning electron microscope (SEM) image of the conventional secondary particle comprising primary micro particles, having the average particle size D50 of 5 μm.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the disclosure of the embodiments described herein is just a most preferred embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" when used in this specification, specifies the presence of stated elements, but does not preclude the presence or addition of one or more other elements.

In the specification and the appended claims, "comprising multiple crystal grains" refers to a crystal structure formed by two or more crystal particles having a specific range of average crystal sizes. In this instance, the crystal size of the crystal grain may be quantitatively analyzed using X-ray diffraction analysis (XRD) by Cu Kα X-ray (Xrα). Specifically, the average crystal size of the crystal grain may be quantitatively analyzed by putting a prepared particle into a holder and analyzing diffraction grating for X-ray radiation onto the particle.

In the specification and the appended claims, D50 may be defined as a particle size at 50% of particle size distribution, and may be measured using a laser diffraction method. For example, a method for measuring the average particle size D50 of a positive electrode active material may include dispersing particles of the positive electrode active material in a dispersion medium, introducing into a commercially available laser diffraction particle size measurement device (for example, Microtrac MT 3000), irradiating ultrasound of about 28 kHz and output power of 60 W, and calculating the average particle size D50 corresponding to 50% of cumulative volume in the measurement device.

In the present disclosure, 'primary particle' refers to a particle having seemingly absent grain boundary when observed with the field of view of 5000 to 20000 magnification using a scanning electron microscope.

In the present disclosure, 'secondary particle' is a particle formed by agglomeration of the primary particles.

In the present disclosure, 'single particle' refers to a particle that exists independently of the secondary particle, and has seemingly absent grain boundary, and for example, it is a particle having the particle diameter of 0.5 $\mu$m or more.

In the present disclosure, 'particle' may include any one of the single particle, the secondary particles and the primary particle or all of them.

Positive Electrode Active Material

An aspect of the present disclosure provides a positive electrode active material in the form of a secondary particle that is different from the conventional art.

Specifically, there is provided a positive electrode active material, 1) comprising at least one secondary particle comprising an agglomerate of primary macro particles,
2) wherein the average particle size D50 of the primary macro particle is 2 $\mu$m or more,
3) a ratio of the average particle size D50 of the primary macro particle/the average crystal size of the primary macro particle is 8 or more,
4) the average particle size D50 of the secondary particle is 3 to 10 $\mu$m, and
5) the secondary particle comprises nickel-based lithium transition metal oxide.

The primary and secondary particles having the features 1) to 5) may provide a nickel-based positive electrode active material with long life and good gas performance.

Hereinafter, the features 1) to 5) of the primary and secondary particles will be described in detail.

Particle Shape and Primary Macro Particle

In general, nickel-based lithium transition metal oxide is in the form of a secondary particle. The secondary particle may be an agglomerate of primary particles.

Specifically, a nickel-based lithium transition metal oxide secondary particle may be obtained by using a dense nickel-based lithium transition metal hydroxide secondary particle prepared by a coprecipitation method as a precursor, mixing the precursor with a lithium precursor, and sintering at the temperature of lower than 960° C. The conventional secondary particle is shown in FIG. 1. However, when a positive electrode active material comprising the conventional secondary particles is coated on a current collector and rolled, particle cracking occurs and the specific surface area increases. When the specific surface area increases, rock salt is formed on the surface, resulting in low resistance.

To solve this problem, a positive electrode active material in the form of a single particle has been additionally developed. Specifically, as opposed to the above-described conventional method using dense nickel-based lithium transition metal hydroxide secondary particle as a precursor, instead of the conventional precursor, the use of a porous precursor makes it possible to synthesize at lower sintering temperatures for the same nickel content, and obtain nickel-based lithium transition metal oxide in the form of a single particle, not a secondary particle. However, when the positive electrode active material comprising single particles is coated on a current collector and rolled, the single particle does not crack, but the other active material cracks.

An aspect of the present disclosure is provided to solve the problem.

When sintering is performed at higher sintering temperatures using a dense precursor in the same way as the conventional art, the average particle size D50 of a primary particle increases, and the average particle size D50 of a secondary particle increases as well.

In contrast, the secondary particle according to an aspect of the present disclosure is different from the method for obtaining the conventional single particle as below.

As described above, the conventional single particle is formed at higher primary sintering temperature using the existing precursor for secondary particle. In contrast, the secondary particle according to an aspect of the present disclosure uses a porous precursor. Accordingly, it is possible to grow a primary macro particle having a large particle size without increasing the sintering temperature, and by contrast, a secondary particle grows less than the conventional art.

Accordingly, the secondary particle according to an aspect of the present disclosure has the same or similar average particle size D50 to the conventional art and a large average particle size D50 of the primary particle. That is, as opposed to the typical configuration of the conventional positive electrode active material, i.e., a secondary particle formed by agglomeration of primary particles having a small average particle size, there is provided a secondary particle formed by agglomeration of primary macro particles, namely, primary particles having a larger size.

Figure 2:
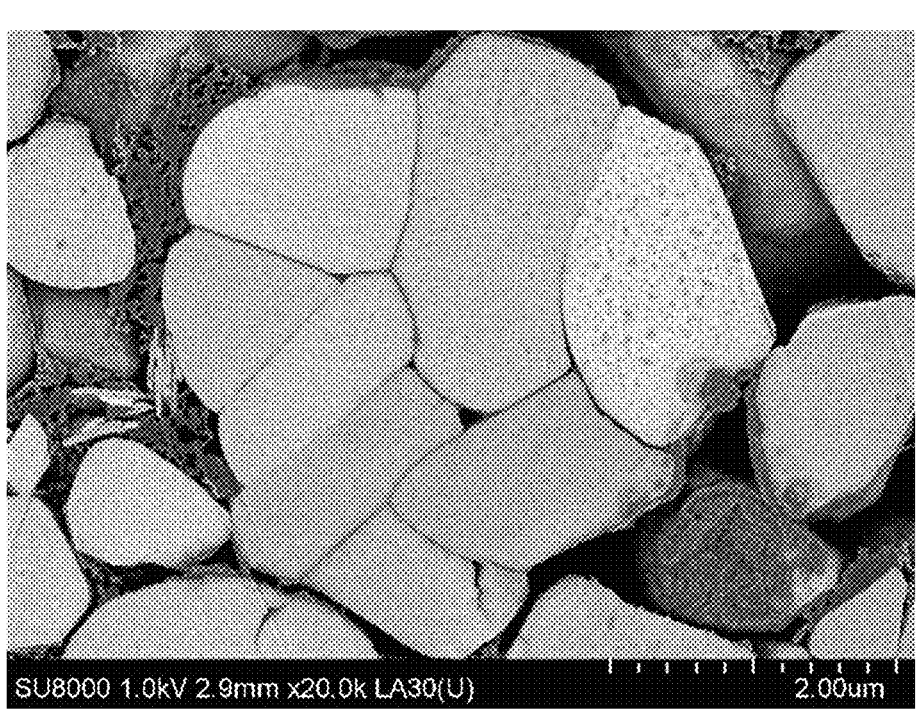
FIG. 2 is an SEM image of a secondary particle comprising primary macro particles according to an aspect of the present disclosure, having the average particle size D50 of 5 μm.
Figure 3:
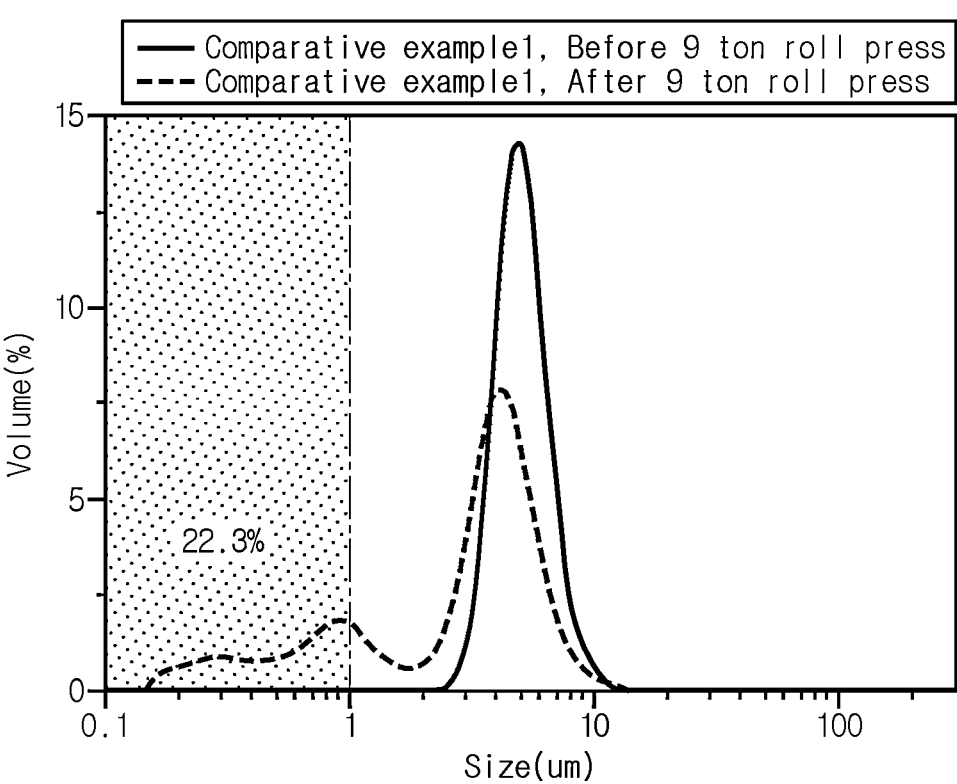
FIG. 3 is a graph showing a comparison of particle cracking before/after rolling, in a positive electrode active material according to comparative example 1 of the present disclosure.
Figure 4:
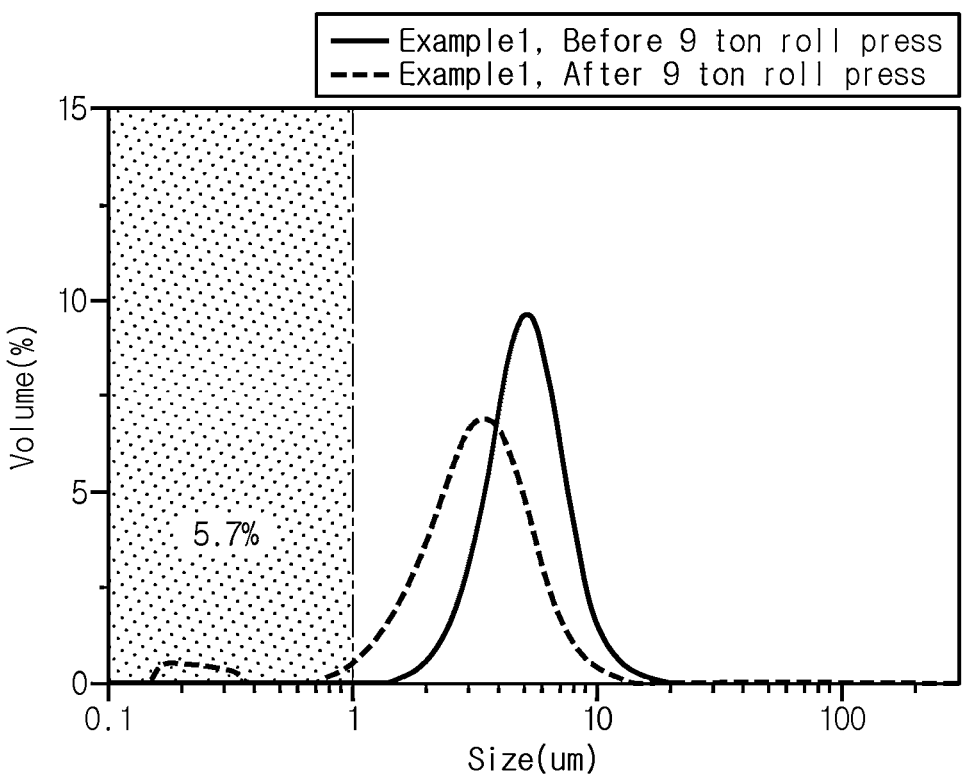
FIG. 4 is a graph showing a comparison of particle cracking before/after rolling, in a positive electrode active material according to example 1 of the present disclosure.
Figure 5:
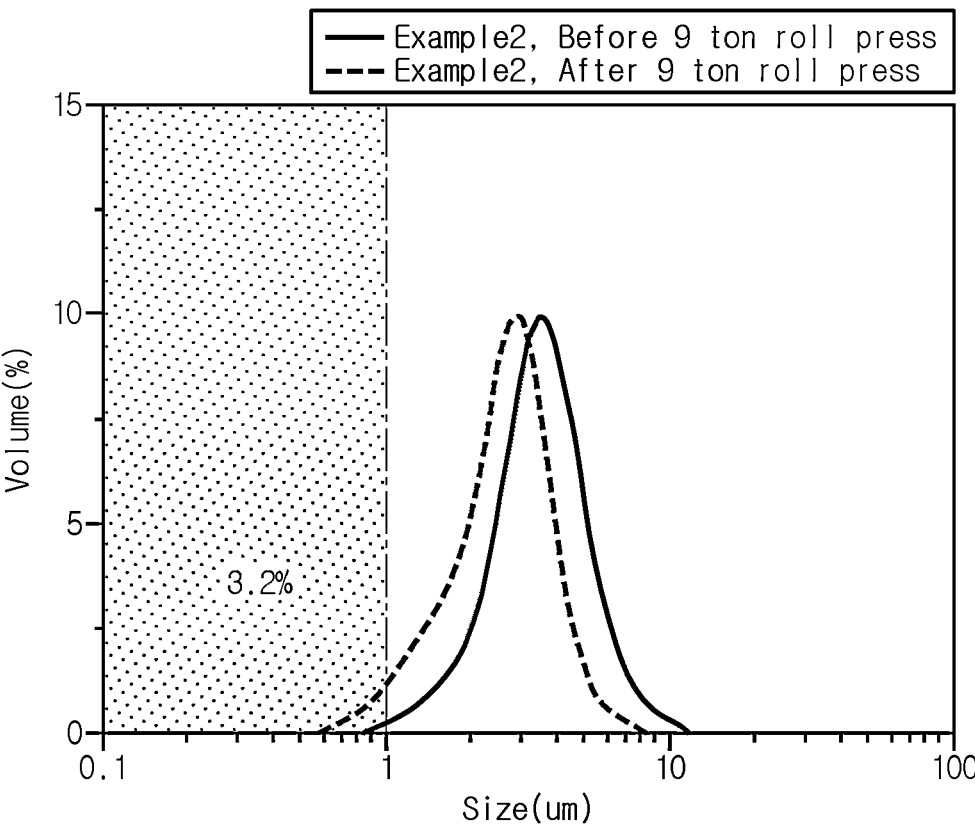
FIG. 5 is a graph showing a comparison of particle cracking before/after rolling, in a positive electrode active material according to example 2 of the present disclosure.

Specifically, the secondary particle according to an aspect of the present disclosure refers to an agglomerate of primary macro particles as shown in FIG. 2. In a specific embodiment of the present disclosure, the secondary particle may be an agglomerate of 1 to 10 primary macro particles. More specifically, the secondary particle may be an agglomerate of 1 or more, 2 or more, 3 or more or 4 or more primary macro particles in the numerical range, and may be an agglomerate of 10 or less, 9 or less, 8 or less, or 7 or less primary macro particles in the numerical range.

In the present disclosure, the 'primary macro particle' has the average particle size D50 of 2 $\mu$m or more.

In a specific embodiment of the present disclosure, the average particle size of the primary macro particle may be 2 $\mu$m or more, 2.5 $\mu$m or more, 3 $\mu$m or more, or 3.5 $\mu$m or more, and may be 5 $\mu$m or less, 4.5 $\mu$m or less, or 4 $\mu$m or less. When the average particle size of the primary macro particle is less than 2 $\mu$m, it corresponds to the conventional secondary particle and particle cracking may occur during the rolling process.

Meanwhile, in the present disclosure, the 'primary macro particle' has a ratio of the average particle size D50/the average crystal size of 8 or more. That is, when compared with the primary micro particles that form the conventional secondary particle, the primary macro particle has simultaneous growth of the average particle size and the average crystal size of the primary particle.

From the perspective of crack, a seemingly absent grain boundary like the conventional single particle and a large average particle size are advantageous. Accordingly, the inventors have made great efforts to grow the average particle size D50 of the primary particle. While research, they have found that when only the average particle size D50 of the primary particle is increased by oversintering, rock salt is formed on the surface of the primary particle, and the initial resistance increases. To solve the problem, the inventors have invented a way to reduce the resistance. Additionally, to reduce the resistance, it is necessary to grow the crystal size of the primary particle as well.

Accordingly, in the present disclosure, the primary macro particle refers to a particle having a large average particle size as well as a large average crystal size and a seemingly absent grain boundary.

Simultaneously growing the average particle size and the average crystal size of the primary particle is advantageous in terms of low resistance and long life, compared to the conventional single particle having the increased resistance due to the rock salt formed on the surface by sintering at high temperature.

As opposed to the conventional single particle, the "secondary particle formed by agglomeration of primary macro particles" used in an aspect of the present disclosure is advantageous in terms of low resistance resulting from the increased size of the primary particle and the reduced rock salt formation.

In this instance, the average crystal size of the primary macro particle may be quantitatively analyzed using X-ray diffraction analysis (XRD) by Cu Kα X-ray. Specifically, the average crystal size of the primary macro particle may be quantitatively analyzed by putting the prepared particle into a holder and analyzing diffraction grating for X-ray radiation onto the particle.

In a specific embodiment of the present disclosure, the ratio of the average particle size D50/the average crystal size is 8 or more, and preferably 10 or more.

Additionally, the average crystal size of the primary macro particle may be 200 nm or more, 250 nm or more, or 300 nm or more.

Secondary Particle

The secondary particle according to an aspect of the present disclosure has the same or similar average particle size D50 to the conventional art and a large average particle size D50 of the primary particle. That is, as opposed to the typical configuration of the conventional positive electrode active material, i.e., a secondary particle formed by agglomeration of primary particles having a small average particle size, there is provided a secondary particle formed by agglomeration of primary macro particles, namely, primary particles having a larger size.

The secondary particle according to an aspect of the present disclosure has the average particle size D50 of 3 μm to 10 μm. More specifically, the secondary particle has the average particle size D50 of 3 μm or more, 3.5 μm or more, 4 μm or more, 4.5 μm or more, 5 μm or more, 5.5 μm or more, or 6 μm or more, and the average particle size D50 of 10 μm or less, 9 μm or less, 8 μm or less, 7.5 μm or less, 7 μm or less, or 6.5 μm or less.

In general, no matter what type of particle, at the same composition, the particle size and the average crystal size in the particle increase with the increasing sintering temperature. In contrast, the primary particle according to an aspect of the present disclosure is a primary macro particle grown to a large particle size without increasing the sintering temperature compared to the conventional art, and by contrast, the secondary particle grows less than the conventional art.

Accordingly, the secondary particle according to an aspect of the present disclosure has the same or similar average particle size D50 to the conventional secondary particle and comprises primary macro particles having a larger average particle size and a larger average crystal size than the conventional primary micro particle.

FIGS. 1 and 2 are SEM images of the conventional secondary particle and the secondary particle according to an aspect of the present disclosure, each having the same average particle size D50, respectively.

Referring to FIG. 1, shown is a secondary particle having the average particle size D50 of about 5 μm formed by agglomeration of a few tens of primary micro particles having the average particle size D50 of about 0.5 μm. The conventional secondary particle forms a large amount of rock salts due to its large specific surface area, and particle cracking occurs so much in the rolling process of a positive electrode active material comprising the secondary particles.

By contrast, referring to FIG. 2, shown is a secondary particle having the average particle size D50 of about 5 μm formed by agglomeration of ten or less primary macro particles having the average particle size D50 of about 2.5 μm. In the rolling process of a positive electrode active material, cracking of the secondary particle does not occur, and when blended with other particle and rolled, particle cracking is minimized.

More specifically, when at least one secondary particle is rolled under 9 tons, the primary macro particle is separated, but does not crack.

Accordingly, after 9 ton roll press of the positive electrode active material according to an aspect of the present disclosure, fine particles of 1 μm or less are less than 10%.

In a specific embodiment of the present disclosure, a ratio of the average particle size D50 of the secondary particle/the average particle size D50 of the primary macro particle may be 2 to 4 times.

Composition

The secondary particle comprises nickel-based lithium transition metal oxide.

In this instance, the nickel-based lithium transition metal oxide may comprise $LiaNi_{1-x-y}Co_xM1_yM2_wO_2$ ($1.0 \leq a \leq 1.5$, $0 \leq x \leq 0.2$, $0 \leq y \leq 0.2$, $0 \leq w \leq 0.1$, $0 \leq x+y \leq 0.2$, M1 is at least one selected from the group consisting of Mn and Al, M2 is at least one selected from the group consisting of Ba, Ca, Zr, Ti, Mg, Ta, Nb and Mo).

In the above formula, a, x, y, and w denote a mole ratio of each element in the nickel-based lithium transition metal oxide.

In this instance, the doped metal M1 and M2 in the crystal lattice of the secondary particle may be disposed on the surface of only a part of the particle depending on the position preference of M1 and/or M2, and may be positioned with a concentration gradient that decreases in a direction from the particle surface to the center of the particle, or may be uniformly positioned over the entire particle.

When the secondary particle is doped with or coated and doped with metal M1 and M2, in particular, the long life characteristics of the active material may be further improved by surface structure stabilization.

The positive electrode active material may further comprise a sintering additive, and the sintering additive may include at least one of zirconium, yttrium or strontium.

The positive electrode active material may be coated with a boron containing material, for example, lithium boron oxide, on the surface such that the boron content is 2000 ppm or less.

The positive electrode active material may be coated with a cobalt containing material, for example, lithium cobalt oxide, on the surface such that the cobalt content is 20,000 ppm or less.

Method for Preparing a Positive Electrode Active Material

The positive electrode active material according to an aspect of the present disclosure as described above may be prepared by the following method. However, the present disclosure is not limited thereto.

Specifically, the method comprises (S1) mixing a nickel-based transition metal oxide precursor having the tap density of 2.0 g/cc or less and a lithium precursor, and performing primary sintering; and (S2) performing secondary sintering on the primary sintered product.

The method for preparing a positive electrode active material will be additionally described for each step.

To begin with, a positive electrode active material precursor comprising nickel (Ni), cobalt (Co) and manganese (Mn) having the tap density of 2.0 g/cc or less is prepared.

In this instance, the precursor for preparing the positive electrode active material may be a commercially available positive electrode active material precursor, or may be prepared by a method for preparing a positive electrode active material precursor well known in the corresponding technical field.

For example, the precursor may be prepared by adding an ammonium cation containing complex forming agent and a basic compound to a transition metal solution comprising a nickel containing raw material, a cobalt containing raw material and a manganese containing raw material and causing coprecipitation reaction.

The nickel containing raw material may include, for example, nickel containing acetate, nitrate, sulfate, halide, sulfide, hydroxide, oxide or oxyhydroxide, and specifically, may include at least one of $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, an aliphatic nickel salt or nickel halide, but is not limited thereto.

The cobalt containing raw material may include cobalt containing acetate, nitrate, sulfate, halide, sulfide, hydroxide, oxide or oxyhydroxide, and specifically, may include at least one of $Co(OH)_2$, $CoOOH$, $Co(OCOCH_3)_2 \cdot 4H_2O$, $Co(NO_3)_2 \cdot 6H_2O$, $CoSO_4$, or $Co(SO_4)_2 \cdot 7H_2O$, but is not limited thereto.

The manganese containing raw material may include, for example, at least one of manganese containing acetate, nitrate, sulfate, halide, sulfide, hydroxide, oxide or oxyhydroxide, and specifically, may include, for example, at least one of manganese oxide such as $Mn_2O_3$, $MnO_2$, $Mn_3O_4$; a manganese salt such as $MnCO_3$, $Mn(NO_3)_2$, $MnSO_4$, manganese acetate, a manganese salt of dicarboxylic acid, manganese citrate and an aliphatic manganese salt; manganese oxyhydroxide or manganese chloride, but is not limited thereto.

The transition metal solution may be prepared by adding the nickel containing raw material, the cobalt containing raw material and the manganese containing raw material to a solvent, to be specific, water, or a mixed solvent of water and an organic solvent (for example, alcohol, etc.) that mixes with water to form a homogeneous mixture, or mixing an aqueous solution of the nickel containing raw material, an aqueous solution of the cobalt containing raw material and an aqueous solution of the manganese containing raw material.

The ammonium cation containing complex forming agent may include, for example, at least one of $NH_4OH$, $(NH_4)_2SO_4$, $NH_4NO_3$, $NH_4Cl$, $CH_3COONH_4$ or $(NH_4)_2CO_3$, but is not limited thereto. Meanwhile, the ammonium cation containing complex forming agent may be used in the form of an aqueous solution, and in this instance, the solvent may include water or a mixture of water and an organic solvent (specifically, alcohol, etc.) that mixes with water to form a homogeneous mixture.

The basic compound may include at least one of hydroxide or hydrate of alkali metal or alkaline earth metal such as NaOH, KOH or $Ca(OH)_2$. The basic compound may be used in the form of an aqueous solution, and in this instance, the solvent may include water, or a mixture of water and an organic solvent (specifically, alcohol, etc.) that mixes with water to form a homogeneous mixture.

The basic compound may be added to control the pH of the reaction solution, and may be added in such an amount that the pH of the metal solution is 9 to 11.

Meanwhile, the coprecipitation reaction may be performed at 40° C. to 70° C. in an inert atmosphere of nitrogen or argon.

Particles of nickel-cobalt-manganese hydroxide are produced by the above-described process, and settle down in a reaction solution. A precursor having the nickel (Ni) content of 60 mol % or more in the total metal content may be prepared by adjusting the concentration of the nickel containing raw material, the cobalt containing raw material and the manganese containing raw material. The settled nickel-cobalt-manganese hydroxide particles are separated by the common method and dried to obtain a nickel-cobalt-manganese precursor. The precursor may be a secondary particle formed by agglomeration of primary particles.

Subsequently, the above-described precursor is mixed with a lithium raw material and goes through primary sintering.

The lithium raw material may include, without limitation, any type of material that dissolves in water, for example, lithium containing sulfate, nitrate, acetate, carbonate, oxalate, citrate, halide, hydroxide or oxyhydroxide. Specifically, the lithium raw material may include at least one of $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$.

In the case of high-Ni NCM based lithium composite transition metal oxide having the nickel (Ni) content of 60 mol % or more, the primary sintering may be performed at 700 to 1,000° C., more preferably 780 to 980° C., and even more preferably 780 to 900° C. The primary sintering may be performed in air or an oxygen atmosphere, and may be performed for 10 to 35 hours.

Subsequently, after the primary sintering, additional secondary sintering may be performed.

In the case of high-Ni NCM based lithium composite transition metal oxide having the nickel (Ni) content of 60 mol % or more, the secondary sintering may be performed at 650 to 800° C., more preferably 700 to 800° C., and even more preferably 700 to 750° C. The secondary sintering may be performed in air or an oxygen atmosphere, and during or after the secondary sintering, cobalt oxide or cobalt hydroxide may be added in such an amount that the cobalt content is 20,000 ppm or less to coat a cobalt containing material on the surface of the positive electrode active material, and during or after the sintering, boric acid may be added in such an amount that the boron content is 2000 ppm or less to coat a boron containing material on the surface of the positive electrode active material. The sintering may be performed with an addition of a sintering additive, and the sintering additive may include at least one of zirconium, yttrium or strontium.

Meanwhile, the method does not comprise any washing process between the steps (S1) and (S2).

The positive electrode active material comprising a secondary particle agglomerate comprising primary macro particles may be prepared by the above-described process.

Positive Electrode and Lithium Secondary Battery

According to another embodiment of the present disclosure, there are provided a positive electrode for a lithium secondary battery, comprising the positive electrode active material, and a lithium secondary battery.

Specifically, the positive electrode comprises a positive electrode current collector and a positive electrode active material layer comprising the positive electrode active material, formed on the positive electrode current collector.

In the positive electrode, the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the positive electrode active material, the positive electrode active material layer may comprise a conductive material and a binder.

In this instance, the conductive material is used to impart conductivity to the electrode, and may include, without limitation, any type of conductive material having electron conductivity without causing any chemical change in the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material may be included in an amount of 1 to 30 weight % based on the total weight of the positive electrode active material layer.

Additionally, the binder serves to improve the bonds between the positive electrode active material particles and the adhesion strength with the positive electrode active material and the positive electrode current collector. Specific examples of the binder may include at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluoro rubber, or a variety of copolymers thereof. The binder may be included in an amount of 1 to 30 weight % based on the total weight of the positive electrode active material layer.

The positive electrode may be manufactured by the commonly used positive electrode manufacturing method except using the above-described positive electrode active material. Specifically, the positive electrode may be manufactured by coating a positive electrode active material layer forming composition comprising the positive electrode active material and optionally, the binder and the conductive material on the positive electrode current collector, drying and rolling. In this instance, the type and amount of the positive electrode active material, the binder and the conductive material may be the same as described above.

The solvent may include solvents commonly used in the technical field pertaining to the present disclosure, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in terms of the slurry coating thickness and the production yield.

Alternatively, the positive electrode may be manufactured by casting the positive electrode active material layer forming composition on a support, peeling off a film from the support and laminating the film on the positive electrode current collector.

According to still another embodiment of the present disclosure, there is provided an electrochemical device comprising the positive electrode. Specifically, the electrochemical device may include a battery or a capacitor, and more specifically, a lithium secondary battery.

Specifically, the lithium secondary battery comprises a positive electrode, a negative electrode disposed opposite the positive electrode, a separator interposed between the positive electrode and the negative electrode and an electrolyte, and the positive electrode is the same as described above. Additionally, optionally, the lithium secondary battery may further comprise a battery case in which an electrode assembly comprising the positive electrode, the negative electrode and the separator is received, and a sealing member to seal up the battery case.

In the lithium secondary battery, the negative electrode comprises a negative electrode current collector and a negative electrode active material layer positioned on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 μm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be made by coating a negative electrode forming composition comprising the negative electrode active material, and optionally the binder and the conductive material on the negative electrode current collector and drying, or casting the negative electrode forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic material that can form alloys with lithium, for example, Si, Al, Sn, Pb, Zn, Bi, In, Mg, Ga, Cd, Si alloy, Sn alloy or Al alloy; metal oxide capable of doping and undoping lithium such as SiOβ (0<β<2), $SnO_2$, vanadium oxide, lithium vanadium oxide; or a complex comprising the metallic material and carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Additionally, the binder and the conductive material may be the same as those of the above-described positive electrode.

Meanwhile, in the lithium secondary battery, the separator separates the negative electrode from the positive electrode and provides a passage for movement of lithium ions, and may include, without limitation, any separator commonly used in lithium secondary batteries, and in particular, preferably the separator may have low resistance and good electrolyte solution wettability in the movement of ions in the electrolyte. Specifically, for example, a porous polymer film made of polyolefin-based polymer such as ethylene homopolymer, propylene homopolymer, ethylene/butene copolymer, ethylene/hexene copolymer and ethylene/methacrylate copolymer or a stack of two or more porous polymer films may be used. Additionally, common porous non-woven fabrics, for example, nonwoven fabrics made of high melting point glass fibers and polyethylene terephthalate fibers may be used. Additionally, to ensure the heat resistance or mechanical strength, the coated separator comprising ceramics or polymer materials may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte that may be used in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, γ-butyrolactone, ε-caprolactone; an ether-based solvent, for example, dibutyl ether or tetrahydrofuran; a ketonebased solvent, for example, cyclohexanone; an aromatic hydrocarbon-based solvent, for example, benzene, fluorobenzene; a carbonate-based solvent, for example, dimethylcarbonate (DMC), diethylcarbonate (DEC), ethylmethylcarbonate (EMC), ethylene carbonate (EC), propylene carbonate (PC); an alcohol-based solvent, for example, ethylalcohol, isopropyl alcohol; nitriles of R—CN (R is hydrocarbon of C2 to C20 straight-chain, branched-chain or cyclic structure, and may comprise an exocyclic double bond or ether bond); and amides, for example, dimethylformamide; dioxolanes, for example, 1,3-dioxolane; or sulfolanes. Among them, the carbonate-based solvent is desirable, and more preferably, cyclic carbonate (for example, ethylene carbonate or propylene carbonate) having high ionic conductivity and high dielectric constant which contributes to the charge/discharge performance improvement of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may range from 0.1 to 2.0M. When the concentration of the lithium salt is included in the range, the electrolyte has appropriate conductivity and viscosity, resulting in good electrolyte performance and effective movement of lithium ions.

In addition to the constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery comprising the positive electrode active material according to the present disclosure is useful in the field of portable devices including mobile phones, laptop computers and digital cameras, and electric vehicles including hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium-large scale device of a power tool; an electric vehicle comprising an electric vehicle (EV), a hybrid electric vehicle, and a plug-in hybrid electric vehicle (PHEV); or an energy storage system.

Hereinafter, the embodiments of the present disclosure will be described in sufficiently detail for those having ordinary skill in the technical field pertaining to the present disclosure to easily practice the present disclosure. However, the present disclosure may be embodied in many different forms and is not limited to the disclosed embodiments.

Example 1

A nickel-cobalt-manganese containing hydroxide ($Ni_{0.88}Co_{0.08}Mn_{0.04}(OH)_2$) positive electrode active material precursor having the tap density of 1.6 g/cc and a lithium raw material LiOH were put into a henschel mixer (700 L) such that the final Li/M(Ni,Co,Mn) mole ratio was 1.03, and mixed at 300 rpm center shaft for 20 minutes. The mixed powder was put into an alumina furnace of 330 mm×330 mm in size and underwent primary sintering at 880° C. under an oxygen (02) atmosphere for 10 hours to form a primary sintered product.

Subsequently, the primary sintered product was ground using a Jet mill at feeding of 80 psi and grinding of 60 psi.

The ground primary sintered product was put into the alumina furnace of 330 mm×330 mm in size, and underwent secondary sintering at 700° C. under an oxygen (02) atmosphere at $Co(OH)_2$ 10,000 ppm for 5 hours to prepare a positive electrode active material.

Example 2

Example 2 was performed in the same way as example 1 except that the conditions were changed as shown in the following Table 1.

Comparative Example 1

4 liters of distilled water were put into a coprecipitation reactor (capacity 20 L), 100 mL of 28 wt % ammonia aqueous solution was added while maintaining 50° C., and a transition metal solution with the concentration of 3.2 mol/L, in which $NiSO_4$, $CoSO_4$, $MnSO_4$ and $Al_2(SO_4)_2$ were mixed at a mole ratio of nickel:cobalt:manganese:aluminum of 82:5:11:2, and a 28 wt % ammonia aqueous solution were continuously put into a reactor at 300 mL/hr and 42 mL/hr, respectively. Stirring was performed at the impeller speed of 400 rpm, and a 40 wt % sodium hydroxide solution was used to maintain the pH at 11.0. Precursor particles were formed by 24-hour coprecipitation reaction. The precursor particles were separated, washed and dried in an oven of 130° C. to prepare a precursor.

The $Ni_{0.82}Co_{0.05}Mn_{0.11}Al_{0.02}(OH)_2$ precursor synthesized by coprecipitation reaction was mixed with $Li_2CO_3$ at a mole ratio of Li/Me (Ni, Co, Mn, Al) of 1.03, and thermally treated at 800° C. in an oxygen atmosphere for 10 hours to prepare a positive electrode active material comprising $LiNi_{0.82}Co_{0.0.05}Mn_{0.11}Al_{0.02}O_2$ lithium composite transition metal oxide.

TABLE 1

| Sample | Unit | Compar- ative ex- ample 1 | Ex- ample 1 | Ex- ample 2 |
|---|---|---|---|---|
| Composition | NCM(A) | 82/5/11/2 | 88/8/4 | 86/8/6 |
| Press density | g/cc | 2.55 | 3.19 | 3.20 |
| Average particle size (D50) of secondary particle | μm | 4.76 | 4.77 | 4.81 |
| Average particle size (D50) of primary particle | μm | 605 nm | 2.33 | 2.50 |
| Average crystal size of primary particle | nm | 130 | 241 | 288 |

TABLE 1-continued

| Sample | Unit | Compar- ative ex- ample 1 | Ex- ample 1 | Ex- ample 2 |
|---|---|---|---|---|
| Ratio of average particle size (D50) of primary macro particle/crystal size of primary macro particle | — | 4.65 | 9.66 | 8.68 |

Experimental Example 1: Observation of Positive Electrode Active Material

Images of the positive electrode active materials prepared in comparative example 1 and example 1 observed under magnification using a scanning electron microscope (SEM) are shown in FIGS. 1 and 2, respectively.

Experimental Example 2: Press Density

The press density was measured using HPRM-1000. Specifically, 5 g of the positive electrode active material of each of example 1 and comparative example 1 was put into a cylindrical mold, and the mold containing the positive electrode active material was pressed under 63.694 MPa. Subsequently, the height of the pressed mold was measured using a Vernier caliper and the press density was calculated. The results are shown in Table 1.

Experimental Example 3: Average Particle Size

D50 may be defined as a particle size at 50% of particle size distribution, and was measured using a laser diffraction method.

Experimental Example 4: Crystal Size of Primary Particle

The sample was measured using Bruker Endeavor (Cu Kα, λ=1.54 Å) equipped with LynxEye XE-T position sensitive detector with the step size of 0.02° in the scan range of 2-theta 15° to 90°, FDS 0.5°, to make the total scan time of 20 minutes.

Rietveld refinement of the measured data was performed, considering the charge at each site (metals at transition metal site +3, Ni at Li site +2) and cation mixing. In crystal size analysis, instrumental broadening was considered using Fundamental Parameter Approach (FPA) implemented in Bruker TOPAS program, and in fitting, all peaks in the measurement range were used. The peak shape fitting was only performed using Lorentzian contribution to First Principle (FP) among peak types available in TOPAS, and in this instance, strain was not considered. The crystal size results are shown in the above table 1.

Experimental Example 5. Particle Cracking Comparison

The initial particle size distribution of the positive electrode active material was measured using particle Size distribution (PSD) 53500 (Microtrac). The measurement method included adding 0.02-0.05 g of sample and 5 drops of a 10 wt % dispersing agent ($NaPO3$)6 to a vial (10 mL) and introducing $H_2O$ to fill the vial. The prepared vial underwent sonication for 2 min. For comparison with the initial particle size distribution, 3 g of positive electrode active material was put into an empty cylinder of 2 cm in diameter and 5 cm in height, and pressed using Carver powder resistance characteristics equipment and measured until 9 tons. After pressed under 9 tons, the positive electrode active material was collected, and PSD was measured by the same method as the above-described method. To compare the degree of particle cracking, a percentage (%) of cracked particles (fine particles of 1 μm or less) after 9 ton-pressing was calculated by comparing the initial particle size distribution with the particle size distribution after pressed under 9 tons.

Figure 6:
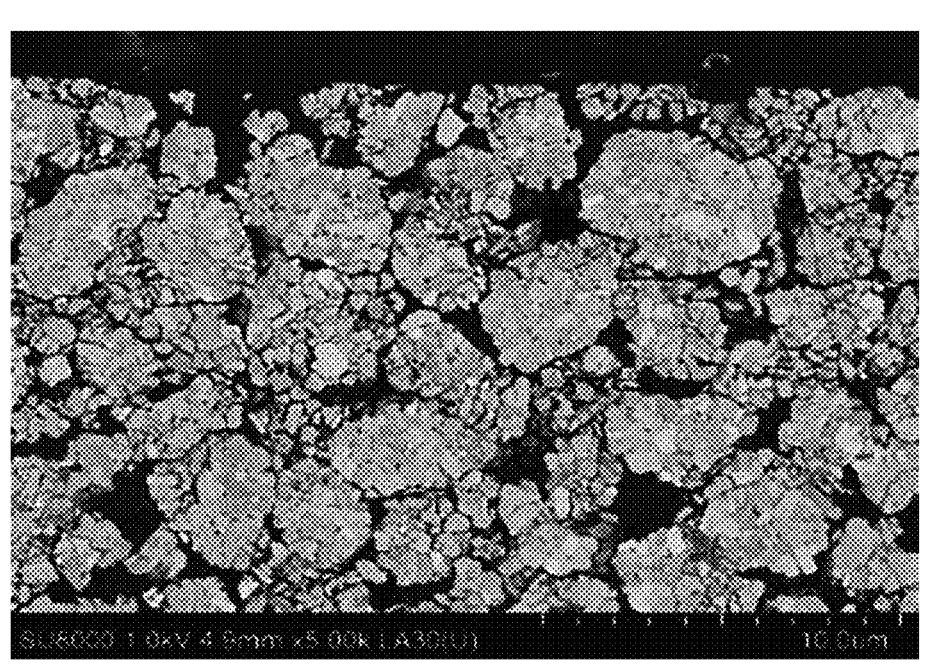
FIG. 6 is an SEM image showing the electrode density of a positive electrode active material according to comparative example 1 of the present disclosure.
Figure 7:
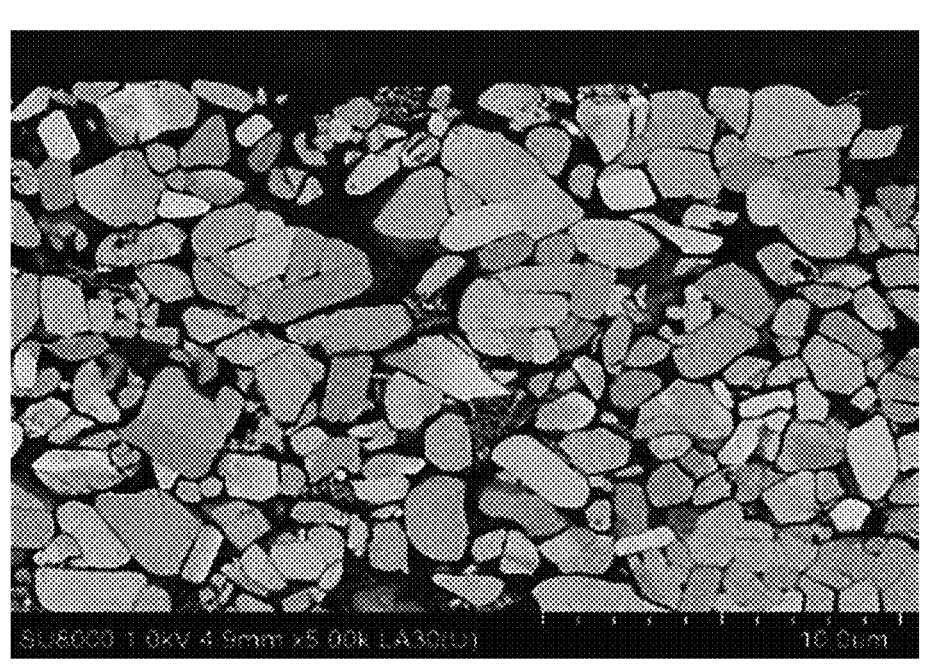
FIG. 7 is an SEM image showing the electrode density of a positive electrode active material according to example 1 of the present disclosure.

Experimental Example 6. Electrode in Cross Section at Electrode Density of 3.4 g/cc Images of the electrode in cross section at the electrode density of 3.4 g/cc observed under magnification using a scanning electron microscope (SEM) are shown in FIGS. 6 and 7.

Figure 8:
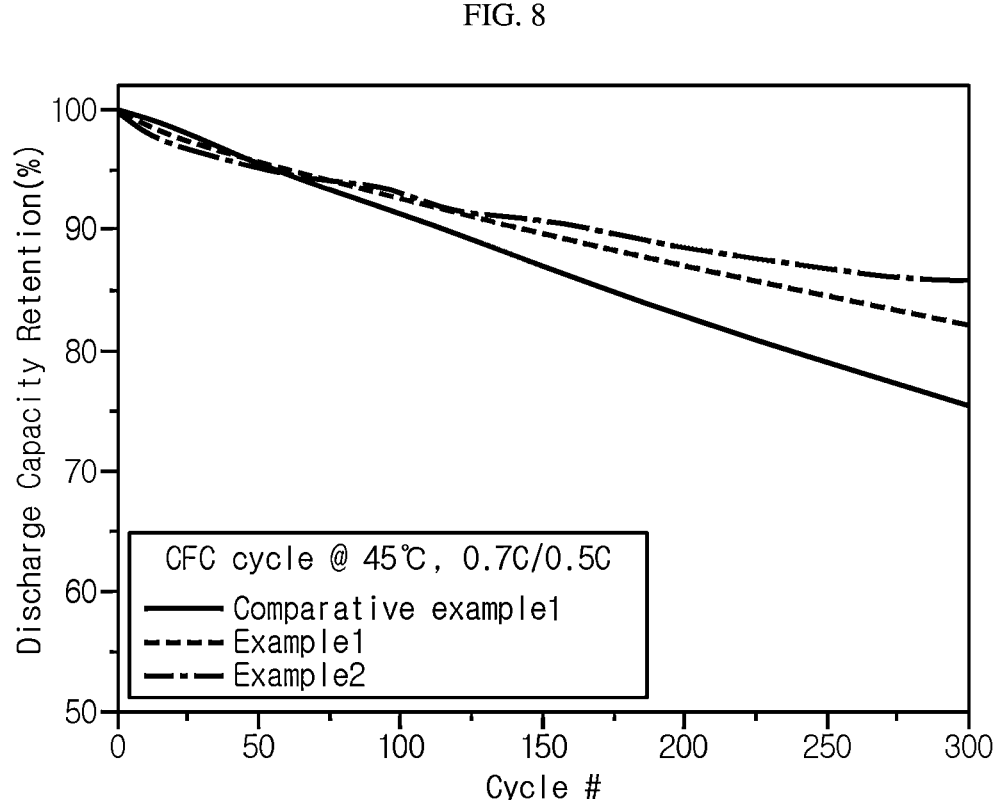
FIG. 8 is a graph showing the life characteristics of examples 1 and 2 and the comparative example of the present disclosure.

Experimental Example 7. High Temperature Life Characteristics of Coin Full Cell Each lithium secondary battery full cell manufactured as below using each of the positive electrode active materials prepared in example 1-2 and comparative example 1 was charged at 0.7 C, 45° C. in a CC-CV mode until 4.25V and discharged at 0.5 C constant current until 2.5V, and capacity retention in 300 cycles of the charge/discharge test was measured to evaluate the life characteristics. The results are shown in FIG. 8.

Specifically, the lithium secondary battery half cell was manufactured as follows.

The positive electrode active material prepared in each of example 1 and comparative example 1, a carbon black conductive material and a PVdF binder were mixed at a weight ratio of 96:2:2 in an N-methylpyrrolidone solvent to prepare a positive electrode material, and the positive electrode material was coated on one surface of an aluminum current collector, dried at 100° C. and rolled to manufacture a positive electrode.

Lithium metal was used for a negative electrode.

An electrode assembly including the positive electrode and the negative electrode manufactured as described above and a porous polyethylene separator between the positive electrode and the negative electrode was made and placed in a case, and an electrolyte solution was injected into the case to manufacture a lithium secondary battery. In this instance, the electrolyte solution was prepared by dissolving 1.0M lithiumhexafluorophosphate (LiPF$_6$) in an organic solvent comprising ethylenecarbonate/ethylmethylcarbonate/diethylcarbonate/(a mix volume ratio of EC/EMC/DEC=3/4/3).

Experimental Example 8. Measurement of Amount of Gas Produced

Figure 9:
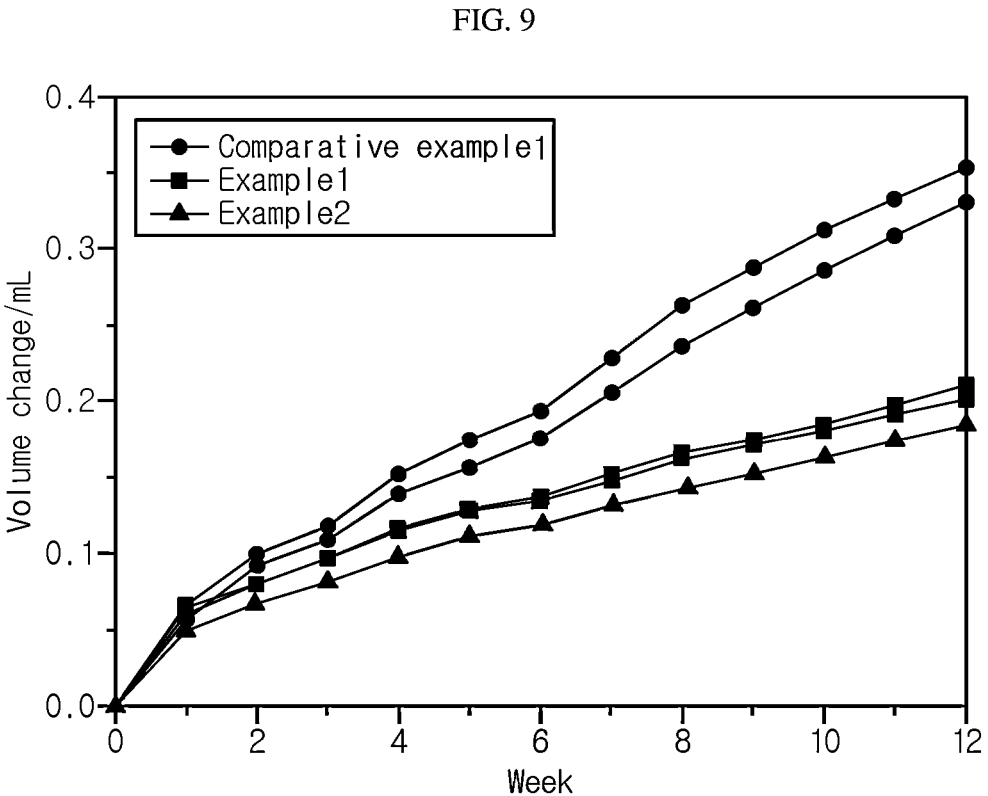
FIG. 9 is a graph showing the measured amount of produced gas at high temperature in examples 1 and 2 and the comparative example of the present disclosure.

For each of the positive electrode active materials according to example 1-2 and comparative example 1, the amount of gas produced was measured and shown in FIG. 9.

Specifically, a method for measuring the amount of gas produced was as follows.

Two sheets of NCM electrodes (loading amount per surface: 380 mg/cm$^2$) charged with 4.2V voltage (full cell basis) and two sheets of separators were placed on a coin cell lower plate and fixed using a gasket, 400 ul of an electrolyte solution (DEC REF.(EC/PC/DEC=3/1/6, VC/PS=0.5/1 Wt %)) was injected once under vacuum, and vacuum sealing was performed on each side to the thickness of 0.5 cm using an Al pouch of 6.5*4.5 cm in size. Here, the vacuum sealing refers to sealing under monocell vacuum sealing condition of 95 kPa/93 kPa. Subsequently, after storage in a convection oven of 60° C. for 12 weeks, the amount of produced gas in the battery was measured. The results are shown in FIG. 9.

Experimental Example 9. Tap Density Measurement Method

The tap density of the precursor was measured using TAP-2S (Model name, LOGAN) in accordance with ASTM B527-06.

What is claimed is:

1. A positive electrode active material for a lithium secondary battery, comprising:
   a secondary particle comprising an agglomerate of a primary macro particle,
   wherein an average particle size (D50) of the primary macro particle is 2 μm or more,
   wherein a ratio of the average particle size (D50) of the primary macro particle to an average crystal size of the primary macro particle is 8 or more,
   wherein an average particle size (D50) of the secondary particle is 3 to 10 μm,
   wherein the secondary particle comprises a nickel-based lithium transition metal oxide,
   wherein the primary macro particle does not crack in a rolling process of the at least one secondary particle under 9 tons, and
   wherein the positive electrode active material further comprises fine particles of 1 μm or less in an amount less than 10% after the rolling process of the positive electrode active material under 9 tons.

2. The positive electrode active material for a lithium secondary battery according to claim 1, wherein the average crystal size of the primary macro particle is 200 nm or more.

3. The positive electrode active material for a lithium secondary battery according to claim 1, wherein a ratio of the average particle size (D50) of the secondary particle to the average particle size (D50) of the primary macro particle is 2 to 4 times.

4. The positive electrode active material for a lithium secondary battery according to claim 1, wherein the nickel-based lithium transition metal oxide comprises LiaNi$_{1-x-y}$Co$_x$M1$_y$M2$_w$O$_2$, and wherein 1.0≤a≤1.5, 0≤x≤0.2, 0≤y≤0.2, 0≤w≤0.1, 0≤x+y≤0.2, M1 includes at least one of Mn or Al, and M2 includes at least one of Ba, Ca, Zr, Ti, Mg, Ta, Nb or Mo.

5. The positive electrode active material for a lithium secondary battery according to claim 1, wherein the positive electrode active material further comprises a sintering additive, the sintering additive including at least one of zirconium, yttrium or strontium.

6. The positive electrode active material for a lithium secondary battery according to claim 1, wherein the positive electrode active material is further coated on a surface thereof with a boron containing material.

7. The positive electrode active material for a lithium secondary battery according to claim 1, wherein the positive electrode active material is further coated on a surface thereof with a cobalt containing material.

8. A positive electrode for a lithium secondary battery comprising a positive electrode current collector and a positive electrode active material layer formed on the positive electrode current collector, the positive electrode active material layer comprising the positive electrode active material according to claim 1.

9. A lithium secondary battery comprising a positive electrode comprising the positive electrode active material according to claim 1.

10. A method for preparing a positive electrode active material for a lithium secondary battery, the method comprising:

(S1) mixing a nickel-based transition metal oxide precursor having a tap density of 2.0 g/cc or less and a lithium precursor and performing primary sintering to form a primary sintered product; and (S2) performing secondary sintering on the primary sintered product, wherein the positive electrode active material for a lithium secondary battery is as defined in claim 1.

11. The method for preparing a positive electrode active material for a lithium secondary battery according to claim 10, wherein a temperature of the primary sintering is 780 to 900° C.

12. The method for preparing a positive electrode active material for a lithium secondary battery according to claim 10, wherein a temperature of the secondary sintering is 650 to 800° C.

13. The method for preparing a positive electrode active material for a lithium secondary battery according to claim 10, wherein the method does not comprise washing between the primary sintering (S1) and the secondary sintering (S2).

* * * * *